United States Patent
Oberg et al.

(10) Patent No.: US 10,289,873 B2
(45) Date of Patent: May 14, 2019

(54) GENERATING HARDWARE SECURITY LOGIC

(71) Applicant: Tortuga Logic Inc., San Diego, CA (US)

(72) Inventors: Jason K. Oberg, San Diego, CA (US); Jonathan Valamehr, San Diego, CA (US); Ryan Kastner, San Diego, CA (US); Timothy Sherwood, San Diego, CA (US)

(73) Assignee: Tortuga Logic Inc., San Diego, CA (US)

( * ) Notice: Subject to any disclaimer, the term of this patent is extended or adjusted under 35 U.S.C. 154(b) by 239 days.

(21) Appl. No.: 15/141,392

(22) Filed: Apr. 28, 2016

(65) Prior Publication Data
US 2017/0316227 A1 Nov. 2, 2017

(51) Int. Cl.
| | |
|---|---|
| *G06F 17/00* | (2019.01) |
| *G06F 21/85* | (2013.01) |
| *G06F 21/50* | (2013.01) |
| *G06F 17/50* | (2006.01) |

(52) U.S. Cl.
CPC .......... *G06F 21/85* (2013.01); *G06F 17/5045* (2013.01); *G06F 21/50* (2013.01); *G06F 2221/032* (2013.01)

(58) Field of Classification Search
CPC ......... G06F 2221/2113; G06F 17/5045; G06F 21/572; G06F 21/50; G06F 2221/034; G06F 9/44505
See application file for complete search history.

(56) References Cited

U.S. PATENT DOCUMENTS

| | | | | |
|---|---|---|---|---|
| 4,926,476 A | * | 5/1990 | Covey | G06F 21/6218 711/163 |
| 2014/0259161 A1 | * | 9/2014 | Kastner | G06F 21/556 726/22 |
| 2015/0058997 A1 | * | 2/2015 | Lee | G06F 9/45558 726/26 |

(Continued)

FOREIGN PATENT DOCUMENTS

| | | | | |
|---|---|---|---|---|
| WO | WO 2014143912 A2 | * | 9/2014 | G06F 21/60 |
| WO | WO-2014143912 A2 | * | 9/2014 | G06F 21/60 |

*Primary Examiner* — Farid Homayounmehr
*Assistant Examiner* — Lizbeth Torres-Diaz
(74) *Attorney, Agent, or Firm* — Fish & Richardson P.C.

(57) ABSTRACT

The present disclosure includes systems and techniques relating to information flow and hardware security for digital devices and microprocessor systems. In general, in one implementation, a technique includes: receiving a hardware design specifying an implementation for information flow in a hardware configuration; receiving one or more labels annotating the hardware design; receiving a security property specifying a restriction relating to the one or more labels for implementing a secure information flow in the hardware configuration; designating each of the one or more labels to a corresponding security level in accordance with the specified restriction; and automatically assigning a respective value to each of the one or more labels in the hardware design, wherein each respective value is determined in accordance with the corresponding security level designated for each of the one or more labels.

12 Claims, 5 Drawing Sheets

(56) References Cited

U.S. PATENT DOCUMENTS

2016/0026801 A1* 1/2016 Kastner .................. G06F 21/60
  726/26
2016/0162689 A1* 6/2016 Martinez ............... G06F 9/4401
  726/1
2017/0316227 A1* 11/2017 Oberg ..................... G06F 21/85

* cited by examiner

GENERATING HARDWARE SECURITY LOGIC

BACKGROUND

The present application describes systems and methods relating to information flow and hardware security for digital devices and microprocessor systems.

In the computing environment, the presence of malicious attacks and exploited system vulnerabilities can become problematic, causing damaging effects to computer hardware components. Therefore, hardware security is becoming of increasing importance in the microprocessor and semiconductor industries. Current hardware security techniques typically utilize manual processes for implementing certain security aspects of the hardware design, for example information flow control.

SUMMARY

The present disclosure includes methods and systems relating to hardware security. According to an aspect, a method performed by data processing apparatus includes: receiving a hardware design specifying an implementation for information flow in a hardware configuration, wherein the hardware design comprises at least two variables relating to the information flow; receiving one or more labels annotating the hardware design, wherein each of the one or more labels corresponds to a respective variable of the at least two variables; receiving a security property specifying a restriction relating to the one or more labels for implementing a secure information flow in the hardware configuration, wherein the security property comprises the one or more labels; designating each of the one or more labels to a corresponding security level in accordance with the specified restriction; automatically assigning a respective value to each of the one or more labels in the hardware design, wherein each respective value is determined in accordance with the corresponding security level designated for each of the one or more labels.

One or more of the following advantages may be provided. The methods and systems described can be employed for creating and optimizing the hardware security logic portion of the hardware configuration, and therefore may achieve an optimized configuration that reduces the amount of space utilized for implementing the circuitry on a semiconductor chip. The methods and systems described provide security property aspects that may realize an automated solution for existing manual implementation procedures related to hardware security design. Additionally, the implementations described for translating a high-level programming language into a hardware security logic may increase the ease and efficiency for design and creation of hardware security primitives to be used for analysis and design. Difficulties relating to cumbersome and complex techniques for configuring security property aspects of hardware design and information flow control may be overcome using the described embodiments. For example, the methods and systems described provide tools for hardware engineers to use a high-level programming language for specifying security properties, implementing information flow control, and creating hardware circuitry. Moreover, the described embodiments can be employed for creating hardware security logic that is used for circuit analysis techniques, such as simulation and emulation, in the hardware security environment.

Details of one or more implementations are set forth in the accompanying drawings and the description below. Other features and potential advantages may be apparent from the description and drawings, and from the claims.

BRIEF DESCRIPTION OF THE DRAWINGS

Like reference symbols in the various drawings indicate like elements.

DETAILED DESCRIPTION

Figure 1:
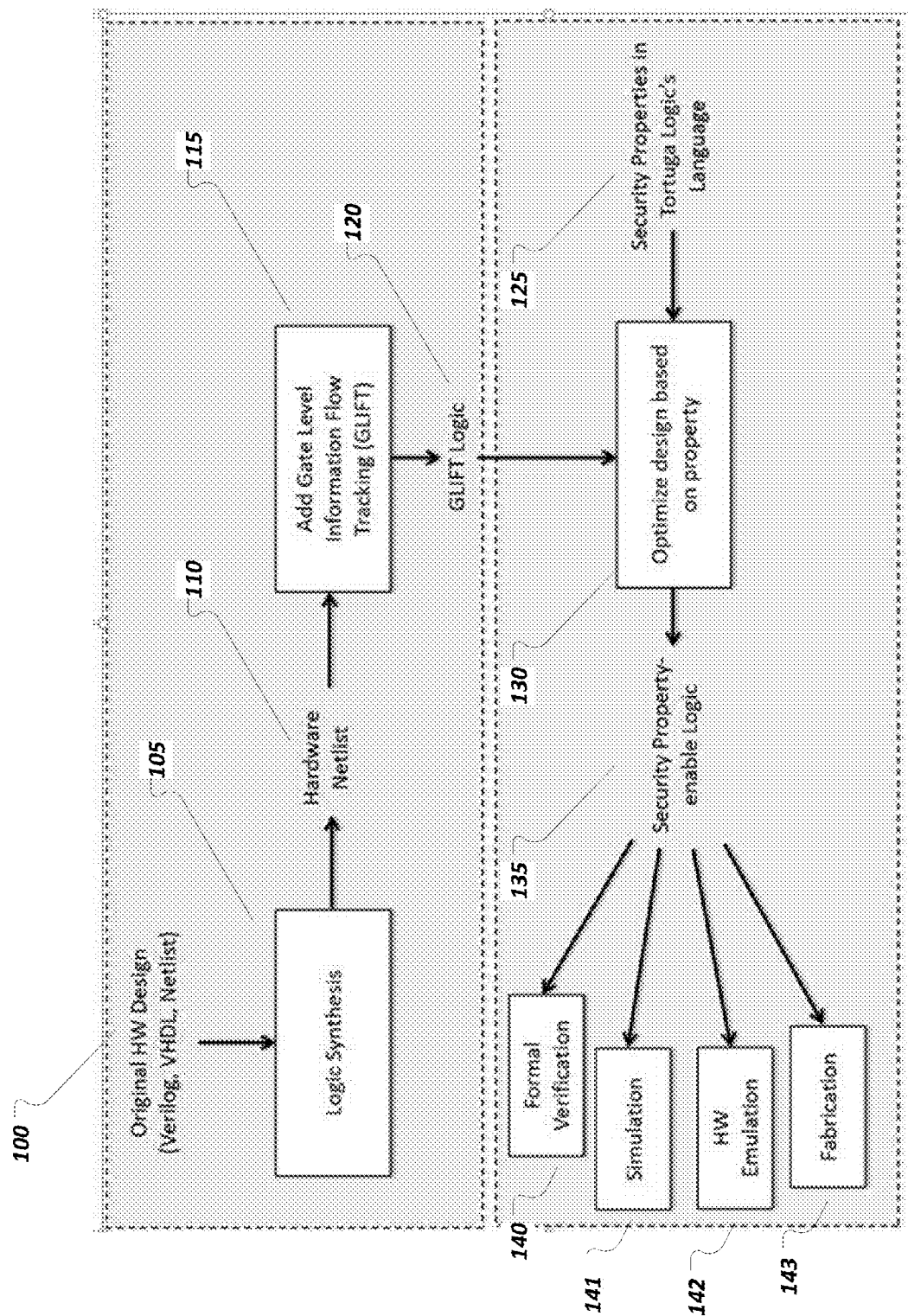
FIG. 1 illustrates an example process for optimizing a hardware design using security properties.

FIG. 1 illustrates an example process for optimizing a hardware design using security properties. A hardware design is received 100 that can be employed in integrated circuit (IC) technology, such as fabrication of a Complimentary-Metal-Oxide-Semiconductor (CMOS) or silicon germanium (SiGe) die. Additionally, implementing a hardware design is not limited to physical chip fabrication in some embodiments, and can involve various other mechanisms for realizing and/or executing the hardware circuitry, such as Field Programmable Gate Arrays (FPGAs), graphics processors, and general-purpose processors. In some implementations, the hardware design is received as an original design that can be further translated into a hardware design that is enabled for information flow analysis. In the implementations, receiving the hardware design can involve specifying an implementation for an electronic circuit or microprocessor for example, including the components, connectivity, flow of information between components, and logical arrangements. The hardware design can describe the circuit using various degrees of abstraction, including but not limited to: gate level, Register Transfer Level (RTL) level, algorithmic level, and behavioral levels. In some implementations, the hardware design can be received as a program received in, or otherwise including, a hardware description language (HDL), such as Verilog, SystemVerilog, Very High speed integrated circuit Hardware Description Language (VHDL), and Netlist for example. Thus, a hardware designer, for example, can employ a suitable HDL for generating the hardware design, and subsequently electronically communicating that hardware design to a processing apparatus for further analysis and synthesis.

In some implementations, at least a portion of the received hardware design is synthesized to gate level primitives, for example, in a logic synthesis process 105. Synthesis 105 can be a process for generating the low level hardware components, such as the gate level primitives. Thus, a result of performing synthesis 105 on the received hardware design can be constructing a hardware netlist 110 from the implementation specified in hardware design. The hardware netlist can be generated at the gate level and including a description of the connections within the hardware design. As an example, the generated netlist consists of a list of the terminals of the electronic components in the circuit, and the electrical conductors that interconnect the terminals. In some implementations, the hardware netlist is not optimized according to area and timing constraints associated with the circuit.

Thereafter, GLIFT logic can be added 115, or otherwise inserted, into the hardware design at the gate level. GLIFT methodologies can be employed for analyzing, statically verifying, and dynamically managing the information-flow behavior for implementing a hardware security logic. For example, GLIFT implements full system information tracking at the logic gate level. GLIFT functions to associate each bit in the hardware design with a one-bit tag (e.g., taint bit), so as to indicate a corresponding security level. Additionally, GLIFT supplements each gate in the hardware netlist, for example, with additional gates used to compute a propagation of the tag in the logic. Therefore, generating the resulting GLIFT logic 120 includes logical components (i.e., bit and gates) that are adding to, or otherwise augmenting, the original hardware design, so as to implement hardware security aspects (e.g., information flow) in the logic.

In some implementations, security properties associated with the hardware design can be programmed and subsequently received in a high-level security language 125, for example Tortuga Logic's Sentinel Language. In the implementations, security properties can be specified using a high-level security language. Tortuga's Logic's language, Sentinel, is shown as an example in FIG. 1, alternatively other high-level security languages may be utilized as deemed necessary and/or appropriate. Accordingly, the embodiments provide the ability to configure and/or create the hardware security logic from a high-level language. As an example, a hardware engineer can program the various security properties associated with the security aspects of hardware design in a manner that may use natural language, automation, and abstraction. Thus, using a high-level language implementation for receiving security properties 125 may provide a process of developing a hardware security logic that is simpler and more understandable in comparison to some earlier generations of secure hardware design languages. Moreover, programming security properties in a high-level language may realize increased expressiveness, ease of design, and implementation efficiency.

Security properties can be utilized for describing, and subsequently enforcing, information flow security in hardware design. In some implementations information flow restricts how information can flow through a hardware logic, and considers a wide range of security vulnerabilities. Therefore, receiving security properties in a high-level security language 125 can involve specifying various information flow restrictions and/or constraints. As an example, security properties can identify which information cannot pass, or otherwise get leaked, into an unclassified location (e.g., confidentiality) and which critical components of the hardware cannot be affected or tampered with by untrusted sources (e.g., integrity). In the implementations, security properties received in high-level security languages can be translated, for example during RTL synthesis, into a security hardware logic, for example at the gate level.

According to an embodiment, optimizing the security logic of the hardware design 130 is performed based on the security properties programmed in the high-level security language. Optimization of the hardware security logic can involve removing circuitry that may be deemed unnecessary in the design or operation of hardware security logic. Also, optimization can include adding circuitry determined to be needed, or otherwise necessary, in the logic. Optimization determinations in the embodiments can be related to various circuit performance metrics and constraints, such as efficient execution time. Thus, the hardware security logic techniques according to the embodiments generates hardware security logic that implements an optimized version of the security logic. Additionally, the implementations may provide the advantages of a reduced circuit area for the hardware security design, such as decreasing space used on a semiconductor chip and reducing propagation delay.

The generated hardware security logic, implementing the security properties, is thereafter enabled 135 and used for various analysis and design techniques. Thus, enabling the hardware security logic can involve additional techniques so as to further analyze, test, and construct the hardware security logic. In some implementations, enabling the hardware security language 135 can involve compiling, so as to translate a logic into a format employed by the analysis and design functions, for example an emulation system. As an example, the analysis and design techniques can be employed to verify that the function of the resulting hardware logic is consistent with one or more security property restrictions. The logic analysis functions performed using the hardware security logic can include, but are not limited to: formal verification 140; simulation 141; hardware emulation 142; and fabrication 143.

In some embodiments, formal verification 140 can include passing the hardware security logic to a formal solver, for example, in order to determine whether any behavior of the logic fails, or otherwise violates, a specified security property. In other implementations, static information flow security verification is performed in formal verification 140. Formal verification 140 can include a design-time verification of some time-sensitive security properties. In some alternative embodiments, compile-time verification of implemented information flow properties can be employed.

Additionally, the security hardware can also be communicated to a simulator, for example, configured to perform simulation 141. The simulation 141 can include employing a series of input tests, where values associated with particular input variables of the hardware design are applied to the logic. Subsequently, the behavior of the hardware security logic design is simulated for a duration, such as multiple design clock cycles, so as to observe and/or detected any security property violations in the simulated behavior.

The hardware (HW) emulation 142 techniques can receive the hardware security logic so as to emulate the behavior of the circuit. HW emulation 142 can provide faster execution of circuit behavior simulations in an embodiment, and thereby may be better suited for debugging than simulation 141, for example.

Also, the hardware security logic can be used in circuit fabrication 143, and thereby employed in construction of one or more physical IC chips. For example, fabrication 143 can involve creating circuit prototypes that are built from physical hardware components, such as a number of FPGAs. According to this embodiment, fabricated IC chips can be used for detection of security property failures, or any additional hardware security violations, in the field of use, for example embedded in a computing system. Moreover, any additional semiconductor and computing techniques that may deemed suitable for testing, evaluating, and analyzing the generated hardware security logic can be applied as one or the various logic analysis functions performed using the hardware security logic.

Figure 2:
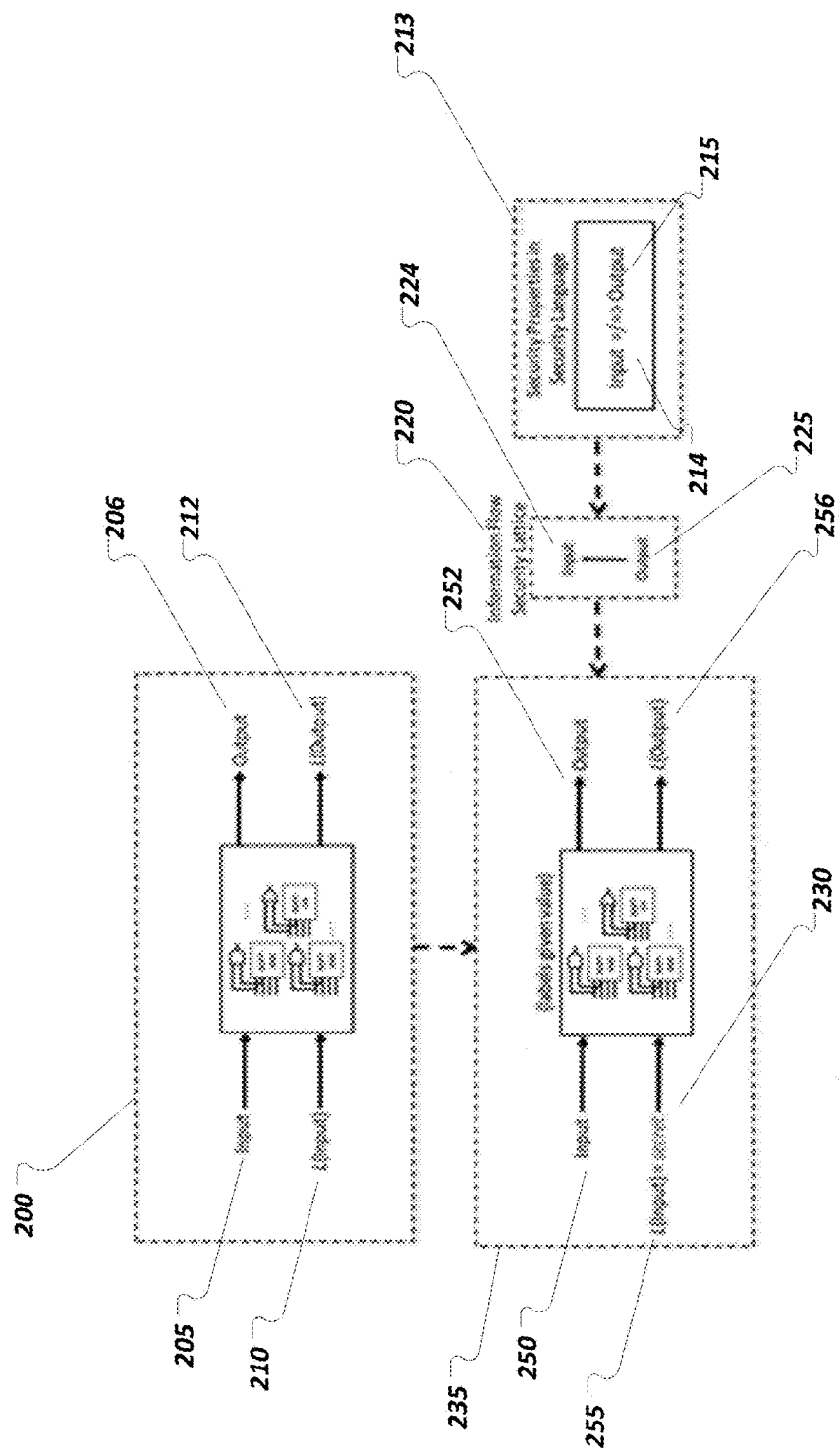
FIG. 2 illustrates an example of a process for implementing a hardware security logic using a high-level security language.

FIG. 2 illustrates an example process for implementing a hardware security logic using a high-level security language. The constructive process shown in FIG. 2 includes a hardware security design 200 that can be a dedicated portion of a hardware design for implementing the secure information flow, for example. In some embodiments, the hardware security design 200 can be a logic specified at the gate level, and generated according to the techniques previously described in connection with FIG. 1. For example, the hardware security design 200 can be implemented as a GLIFT logic. According to the embodiments, the hardware security design 200 can include a set of inputs 205 and outputs 206 corresponding to input ports and output ports, respectively, included in the configuration of the hardware security logic. Additionally, in some implementations, the inputs 205 and outputs 206 can be represented as one or more variables used in mechanisms for specifying a hardware design, for example a HDL.

Additionally, the variables can be further associated with security labels 210, 212. As shown in FIG. 2, a security hardware design 200 is annotated with security label 210 that corresponds to an input. Also, label 212 corresponds to an output of the hardware design. It should be appreciated that one or more security labels can be appropriately associated with any hardware element, or variable, specified in a hardware design as deemed suitable. In some implementations, the labels 210, 212 can be utilized as annotations to the specified hardware design. Accordingly, the labels 210, 212 can be applied to augment a security hardware design 200 in HDL, for example, with more natural language descriptive terms for the components, data, and connectivity within the hardware logic. In the embodiments, at least one label is including in the hardware security design 200. As an example, the hardware security design 200 may include a security label of "key_signal" that can be associated with, or otherwise represent, an encryption key. Therefore, implementing security labels 210, 212 may realize certain benefits associated with high-level programming language techniques applied to designing security hardware logic, and thereby may increasing ease of design in the embodiments.

According to the implementations, security properties for a hardware design can be received in a high-level security language 213. Implementing techniques for employing a high-level programming language for specifying secure information flow and/or security properties are described in connection with FIG. 1. In the implementations, information flow control mechanisms can operate to associate the security labels 210, 212 with the data and the hardware components, or resources, within the hardware security design 200. For example, security property 213 includes labels 214, 215 and specifies a hardware-level information flow. The security property 213 specifies a particular restriction to implement a secure information flow within a hardware design. As shown in FIG. 2, the security property 213 can be specified in an expression implemented in a high-level security language, for example, "Input=/=>Output", which checks an information flow between source (e.g., Input) and destination (e.g., Output). The security property 213 illustrated in FIG. 2 defines, or otherwise specifies the information flow restriction, that Input should not flow to Output. In some embodiments, the high-level security language can implement various variables, objects, complex arithmetic or boolean expressions, subroutines and functions for defining security properties. As an example, Sentinel language can specify labels, signals, registers, expressions, conditionals, logical operators, and keywords, allowing for a high-level implementation of information flow.

In an implementation, Tortuga Logic's Sentinel language includes a wide range of operators that can improve the expressiveness of specifying security properties. The not flow "=/=>" operator, as illustrated in FIG. 2, is the core of the Sentinel language and allows for specifying if information can flow from some source to a destination. For example, key=/=>debug_out would specify that the key should not flow to debug_out. All operators in Sentinel can be applied to any signal in the design and need not be an input or an output.

Additionally, Sentinel includes the "ignoring" operator, which allows for declassifying of data or deeming information flows as secure. For example, if data is processed through an encryption engine, then it is mathematically infeasible to extract the secret key from the ciphertext. As such, this information should no longer be labeled "secret" and can be declassified. An example property would be "key-/->out ignoring aes.data_out" where aes.data_out is the ciphertext output of an AES encryption block in the design.

Moreover, Sentinel also has support for specifying when information should be tracked. This can be useful for specifying security properties when switching between security modes or debug states. This can be accomplished using Sentinel's "when" operator. For example, suppose a particular memory region is secure and secure data flow needs to be monitored only when reading from that secure memory region. In other words, if the address to the memory would allow access to the secure region. According to the implementation, the "when" keyword is used as follows: "mem_out when addr=SECURE=/=>out". Mem_out is the output of the memory and out is an insecure output or location. The "when addr=SECURE" allows marking mem_out as secure only when the address is SECURE meaning that mem_out would contain secure data.

Tortuga Logic's Sentinel has other various keywords such as "$all_outputs", specifying sets of signals "{ }", and so on. The features of Sentinel as described are not intended to be exhaustive, and include examples of implementations of the language. It should be appreciated that Sentinel, according to the embodiments, may realize an expressiveness within the language that allows for specifying a wide range of security properties suitable for the hardware design lifecycle. In addition, future versions of Tortuga Logic's Sentinel may be at higher abstractions allowing for the user to not be required to specifying individual signals in the design.

In some embodiments, security properties 213 specifying information flow restrictions for a hardware design can be further specified as one or more security lattices 220. The security lattice 220 can be an ordering structure including the labels 214, 215 specified in the security property 213. Moreover, security lattice 220 can specify a hierarchical order for the labels 224, 225 included therein. Moreover, the hierarchical order within the security lattice 220 indicates security levels with respect to the security labels 224, 225. The security levels can be determined from security lattice 220, where the ordering, or partial ordering, indicates which information flows are secure.

In an embodiment, the ordering levels of a security lattice 220 are arranged in a "bottom-up" hierarchical configuration, that is, information flows are allowed to higher elements in the lattice. For instance, labels 224, 225 are arranged in a hierarchical order corresponding to the label's restrictiveness, as defined in the security property, in relation to another label. As an example, the labels 224, 225 are arranged within security lattice 220 in a manner such that "input" associated with a label 224 is placed higher in the security lattice 220 (e.g., HIGH), and is thus defined as more restricted (i.e., can flow to fewer places) than "output" associated with label 225, which is lower in the structured order (e.g., LOW). Therefore, security labels 224, 225 can be designated with a corresponding security level based on the order (e.g., HIGH or LOW) of each label within security lattice 220. In some implementations, a security level can be assigned, or otherwise associated with each level of the security lattice 220. Alternatively, in some embodiments, various other data structures that may be suitable for ordering and/or indicating a hierarchical order can be utilized in place of, or in addition to, security lattice 220. One or more security lattices 220 can be employed for implementing each respective security property 213 defined for the information flow control of a security hardware design 200. In other embodiments, a security lattice 220 can implement more than one security property 213.

As an example, the structure of security lattice 220 includes a two label hierarchical arrangement indicating that Output, label 225, flowing to Input, label 224, is a secure information flow that is allowed according to the security property 213. A violation of the security property 213 can include a conversely occurring instance of Input, which is the more restricted label 224, flowing to Output label 225. Accordingly, in some implementations, a security hardware logic implementing an information flow violating one or more specified security properties 213 can be detected. Moreover, in the example, label 224 can be designated to the corresponding security level of "secret", in accordance with the hierarchical order specified in the security lattice 220. Therefore, the security lattice 220 can be employed to identify, or otherwise define, security label/security level associations, based on the security properties 213. One or more security levels employed in the security lattice 220 can include, but are not limited to, unclassified, secret, top secret, for example.

In some embodiments, a security lattice 220 is optionally employed. Thus, downstream implementation operations for configuring the hardware can be realized directly from the security properties 213 as specified in the high-level security language, and without requiring the creation of a security lattice 220. According to the implementation, the high-level security language can be employed as the mechanism for mapping to security labels of a hardware design. For example, operations defined by the high-level security language can be mapped to labels of a hardware design, thereby translating the hardware design into a logic that is enabled for information flow analysis. In some implementations, a backend approach I utilized for information flow analysis, in which various information flow analysis platforms can be applied to the hardware configuration subsequent to implementing the security aspects of the hardware design via the high-level security language. For instance, implementing security aspects of the hardware design, according to the embodiments, is accomplished using Sentinel. Thereafter, GLIFT is employed as a security platform to implement information flow analysis on the hardware configuration.

Thereafter, the embodiments can function to automatically assign a value to each respective label in a logic design that corresponds to a security label/security level association indicated by the generated security lattice 220. In an implementation, the security hardware design 200 can be augmented with the particular value 230 assigned to each security label 255 corresponding to a security level. As displayed in FIG. 2, label 255 is assigned a value associated with "secret" within the hardware security logic 235. For example, a GLIFT logic that employs a one-bit tag, or label, can be automatically augmented by setting the labels corresponding to "secret" security level to 1. Thus, the resulting hardware security logic 235 includes labels that are assigned to values, and logical outputs associated with security levels. The hardware security logic 235 also includes variables 250, 252 and label 256 that is not assigned a value. Thus, according to some implementations, values 230 are assigned to a portion of the labels and/or variable present in the hardware design. In the implementation, values can be automatically assigned to every bit corresponding to a security label within a hardware security design. Also, in some implementations, a security level can be automatically assigned to each logic gate of the tracking logic implemented using various secure hardware design techniques. In some techniques, hardware designers manually specify the security labels and associated values in a security hardware design, which may exacerbate programming (and debugging) difficulties in the design processes. The process of manually editing and/or annotating a hardware design, which at the gate-level for a complex design, for example, can be cumbersome and difficult to configure. The embodiments implement a technique that enforces information flow security in the hardware security logic 235, while providing an automated solution that overcomes the challenges associated with manual aspects of security hardware designs.

In an implementation, the values for security labels are computed, or otherwise evaluated, and inserted into the hardware security logic during synthesis. A synthesizer, or logic synthesis tool, can be employed to insert bits and/or logic into the hardware design, for example, to achieve the automated aspects of the embodiments. Thus, a synthesizer can be employed to translate the logic operations specified in security properties 213 and/or the security lattice 220 implemented using high-level security language into a synthesizable hardware design configured to implement secure information flow. In some embodiments, a compiler can be additionally employed to support an automatic translator capability used to translate programmed code in a high-level security language into a HDL.

Figure 3:
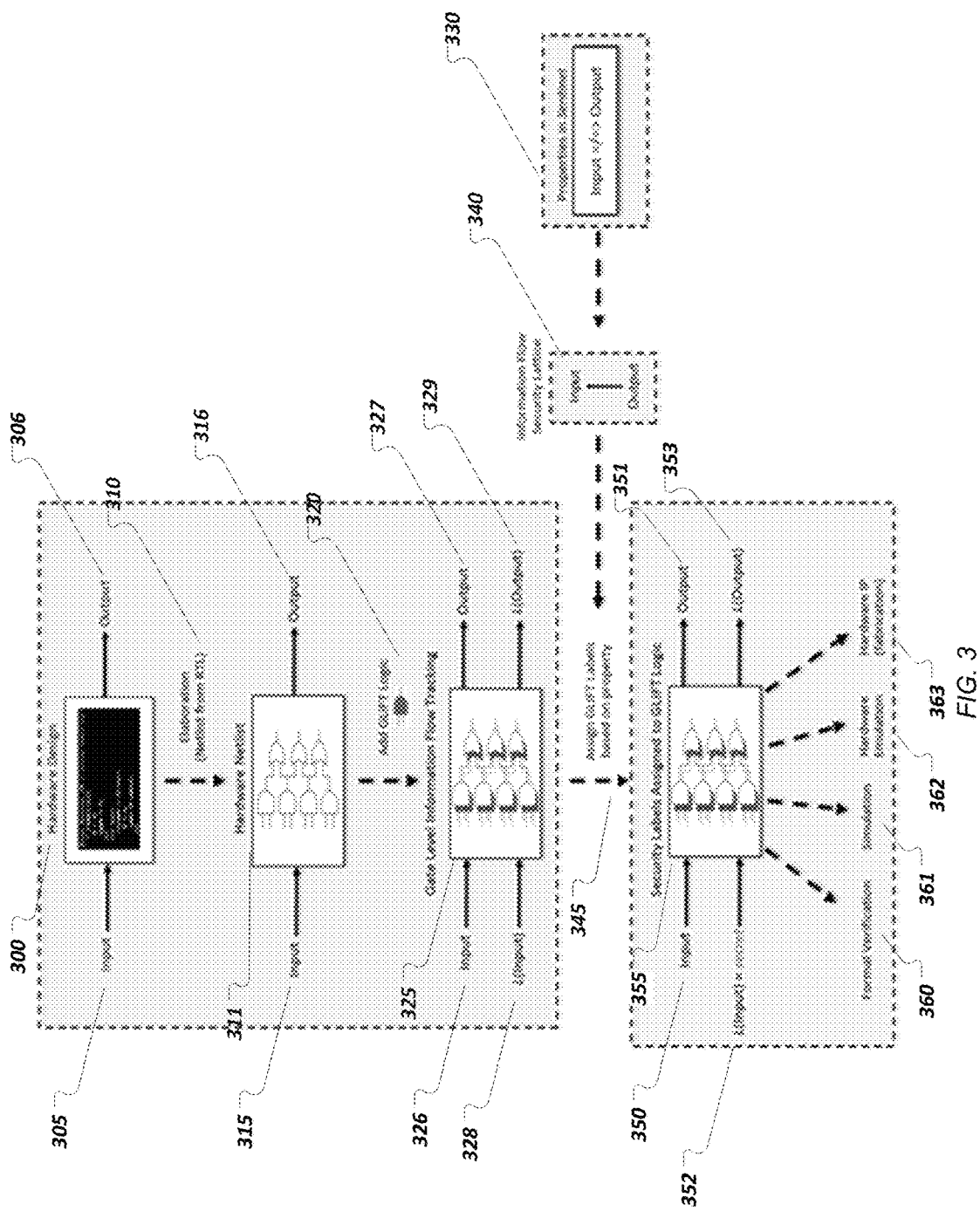
FIG. 3 illustrates an example of a process for implementing a Gate Level Information Flow (GLIFT) hardware security logic using a high-level security language

FIG. 3 illustrates an example process for implementing a GLIFT hardware security logic using a high-level security language. It can be appreciated that GLIFT is shown in FIG. 3 as an example of a technique employed for implementing the security aspects of a hardware configuration. Therefore, the embodiments described can be integrated into various other hardware security platforms, in addition to GLIFT, that are used for information flow analysis, such as SecVerilog, Caisson, and Sapper. According to the implementation illustrated in FIG. 3, a hardware design is received 300. In some implementations, the hardware design can be received at a RTL level of abstraction in a HDL, such as Verilog, for example. Moreover, the RTL level hardware design can specify the electronic circuit configuration including signals between hardware registers and the logical operations performed on the signals. The hardware design can include one or more variables 305, 306. As shown in FIG. 3, the variable 305 is associated with "Input" and 306 is associated with "Output". It should be appreciated that variables illustrated in FIG. 3 are shown as an example, and are not limited to input and outputs. Thus, in implementations, signals and wires within the hardware logic can also be assigned variables. In some embodiments, the RTL modeled hardware design can be conveyed into a logic synthesizer and resultantly elaborated into, or otherwise employed to generate, a gate-level abstraction 310 of the hardware design. Generating a gate-level model of the hardware design can include creating a Netlist from the RTL design 311. The generated hardware Netlist, as displayed in FIG. 3, can include terminals ("pins") of the hardware logic components and their connections in the circuit design. For example, the Netlist model for the hardware design can include terminals 315, 316 that can be associated with terminals "Input" and "Output" respectively.

In some embodiments, GLIFT logic can be added to, or used to augment, 320 the hardware design. The implementations for adding GLIFT logic can involve techniques as described in connection with FIGS. 1-2. For example, the GLIFT security hardware design 325 includes additional logic and bits (e.g., associated with each logic gate and bit of the hardware design), as illustrated in FIG. 3, in the tracking technique. According to the embodiments, the GLIFT security hardware design 325 includes one or more variables that can be used to represent terminals, for example variables 326, 327 Also, the GLIFT hardware design can include at least one security label, such as labels 328, 329.

Additionally, various security properties can be received 330 specifying the information flow restrictions. In the embodiments, receiving security properties can involve a high-level security language employed to generate a program including the security properties. For instance, the security properties can be specified using Tortuga Logic's Sentinel language. Further details for specifying the security properties 330, and subsequently generating the corresponding information flow security lattice 340 from the security properties involve techniques as described in connection with FIGS. 1-2. As previously described, generating a security lattice 340 effectuates a designation of security levels to security labels.

Thereafter, in the implementations, security labels within the GLIFT logic are automatically assigned a value 345 based on the security lattice. As displayed in FIG. 3, security label 352 is assigned a value of "secret" that can correspond to a security level of the label within the security lattice. Thus, the embodiments can function to perform an automated technique for assigning values for security labels in a hardware security design 355. In some implementations, each security label of a GLIFT logic is automatically evaluated. The techniques described can allow for increased configurability of the security requirements of a GLIFT logic, by implementing security properties using of a high-level security language. Moreover, the embodiments of FIG. 4 support configuration of a hardware security logic by employing GLIFT techniques in concert with high-level security language capabilities. According to the embodiments, the hardware security logic 355, including the GLIFT logic, also includes one or more variables, for example variables 350, 351.

In some implementation, the hardware security logic 355 can be further utilized to perform analysis and design techniques. Such logic analysis functions performed using the hardware security logic 355 can include, but are not limited to: formal verification 360; simulation 361; hardware emulation 362; and fabrication 363. Also, some embodiments include implementing a change in the security properties, or configuration of the security logic, based on detecting a violation of information flow policies. For example, during execution of a logic analysis function, an information flow that violates one or more security properties specified for the hardware design can be intercepted and/or detected. As a result, any particular security property that can be identified as being associated with a secure information flow violation, as well as the hardware security logic, can be reconfigured and/or redesigned.

Figure 4:
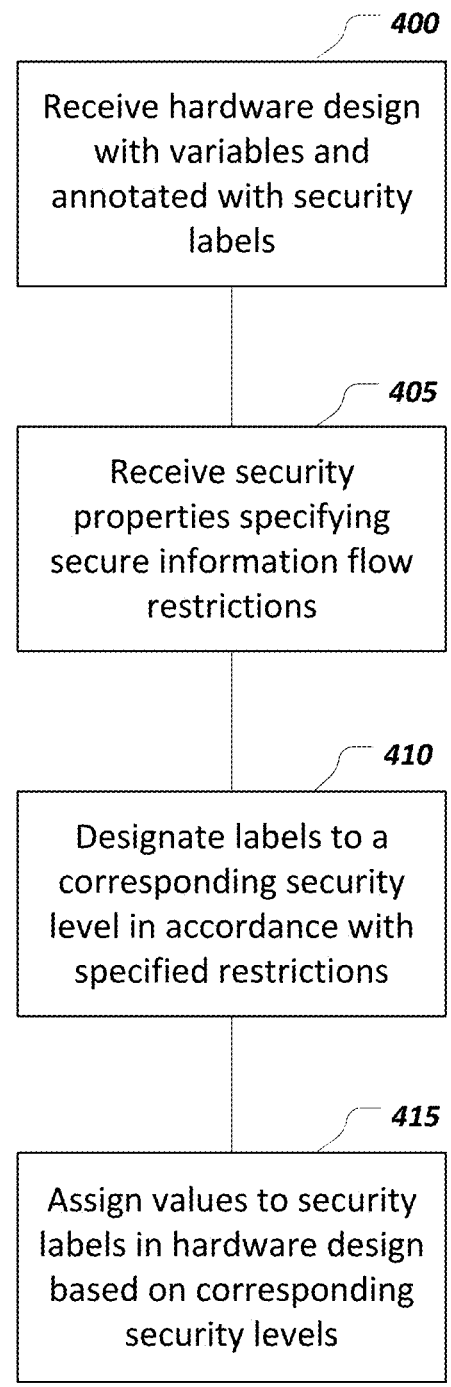
FIG. 4 illustrates a block diagram example of a process for implementing a hardware design using security properties.

FIG. 4 illustrates a block diagram of an example process for implementing a hardware design using security properties. According to the embodiments, a data processing apparatus (shown in FIG. 5) can be employed for performing the functions of the described process. A hardware design for an IC chip implementation, for example, is received 400. Receiving the hardware design can include generating a source code including multiple variables, using a HDL, for instance, to specify the circuit configuration. In the implementations, the received hardware design is annotated with at least one security label. The security labels may provide more natural language terminology for the variables in the hardware design, thereby increasing the ease of use in the hardware design process.

In the embodiments, security properties are received for specifying restrictions in a secure information flow 405 implementation. Receiving the security properties can include specifying information flow control for the hardware design, such as outlining restrictions pertaining to how information is allowed to flow between components of the circuit. Additionally, the embodiments implement receiving security properties in a high-level security language, for example Tortuga Logic's Sentinel language. Thereafter, security labels are designated to a corresponding security level 410 in accordance with the information flow restrictions, as specified in the security properties. In some implementations, the security level designations are determined, or otherwise evaluated, using information flow control mechanisms such as ordering the security labels within a security lattice. Thus, in some implementations, designating security levels for security labels includes generating an ordering structure of at least two levels, such as a security lattice.

The security levels, as designated in 410, can then be utilized for automatically assigning a respective value to each corresponding security label in a hardware design 415. The values assigned to particular security labels can be determined in accordance with the security levels. Accordingly, an automated process of assigning values (e.g., corresponding to security values) to security labels within a hardware design is employed. For example, a security label annotating a hardware design can be assigned a value that is consistent with the security properties, without the need for manually setting bits by a hardware engineer. In some implementations, automatically assigning values to security labels within a hardware design is an operation performed by a synthesizer, or logic synthesis tool, which further includes translating the security properties received in a high-level language into a gate level hardware logic. Thus, the techniques as described in connection with FIG. 4, implements specifying information security properties at a higher level of abstraction, and automatically performing some security aspects of the hardware logic design based on the abstraction (i.e., setting the security labels).

Figure 5:
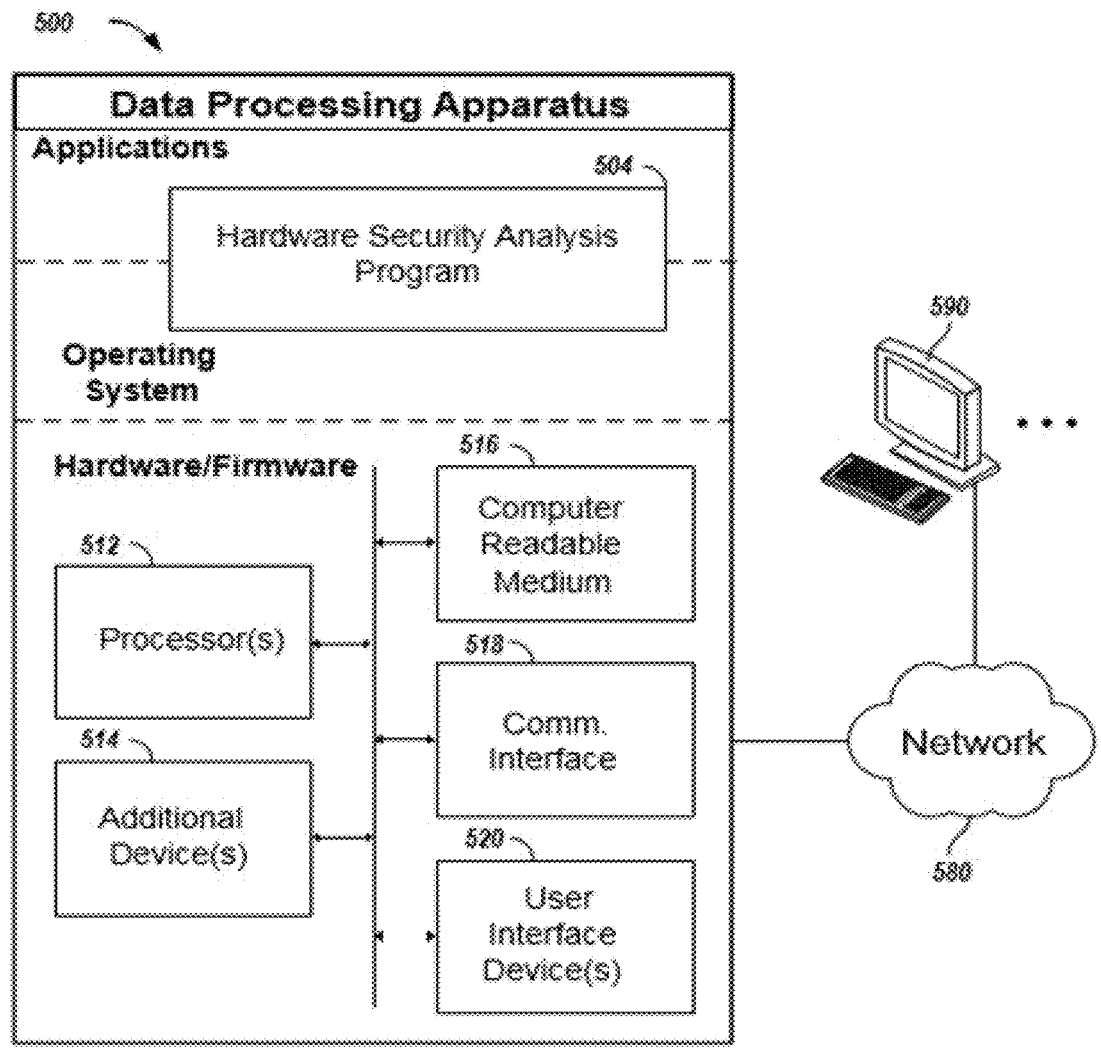
FIG. 5 is a schematic diagram of a data processing system

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services for hardware design involving specifying an implementation of an electronic circuit or microprocessor, such as HDL programs, and synthesizers for translating logic operations specified in a high-level security language into a hardware security logic, for example. In some implementations, the data processing apparatus 500 includes a Hardware Security Analysis Program 504 that can implement the systems and techniques described above and variations thereof for programming, or otherwise specifying, one or more security properties about a hardware design.

The Hardware Security Analysis Program 504 can implement a high-level programming language using systems and techniques for specifying secure information flow and/or security properties further described in connection with FIGS. 1-4 and variations thereof. Regardless, of the operational details, the number of software modules used can vary from one implementation to another. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses its communication interface 518 to communicate with one or more computers 590, for example, over a network 580. In some implementations, the computers 590 can be employed to execute logic analysis functions, such as formal verification and emulation. Examples of user interface devices 520 include a display, a camera, a speaker, a microphone, a tactile feedback device, a keyboard, and a mouse. The data processing apparatus 500 can store instructions that implement operations as described above, for example, on the computer readable medium 516 or one or more additional devices 514, for example, one or more of a floppy disk device, a hard disk device, an optical disk device, a tape device, and a solid state memory device.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an Application Specific Integrated Circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method performed by data processing apparatus, the method comprising:
   receiving an initial hardware design specifying an implementation for information flow in hardware circuitry, wherein the initial hardware design comprises at least two variables relating to the information flow;
   receiving one or more security labels annotating the initial hardware design, wherein each of the one or more security labels corresponds to a respective variable of the at least two variables;
   receiving, in a high-level security language, a security property specifying a restriction on the information flow in the hardware circuitry, and, thus, the security property defining secure information flow in the hardware circuitry, wherein the security property specifies a relationship between the variables;
   designating each of the one or more security labels to a corresponding security level in accordance with the specified restriction by generating, based on the security property, an ordering structure specifying a hierarchical order comprising at least two security levels;
   generating a modified hardware design including automatically assigning a respective value to each of the one or more security labels in the initial hardware design based on the generated ordering structure, wherein each respective value is determined in accordance with the corresponding security level designated for each of the one or more security labels, wherein automatically assigning values to the security labels includes translating the security property from the high-level language into gate-level hardware logic; and
   processing the automatically assigned label values to create a representation of security logic for the hardware circuitry, wherein the security logic implements the secure information flow defined by the security property.

2. The method of claim 1, wherein the hierarchical order of the at least two security levels comprises a higher security level corresponding to a more restricted label specified in the security property and a lower security level corresponding to a less restricted label specified in the security property.

3. The method of claim 1, wherein the ordering structure is generated as a security lattice.

4. The method of claim 1, wherein the processing comprises:
   optimizing the security logic based on the received security property by removing circuitry from the security logic or adding circuitry to the security logic in accordance with the security property.

5. The method of claim 4, wherein the processing comprises:
   performing one or more logic analysis functions using the optimized security logic,
   wherein the one or more logic analysis functions comprises: formal verification, simulation, and hardware emulation.

6. The method of claim 1, wherein the processing comprises:
   deploying the security logic to implement circuitry in fabrication or FPGA.

7. An apparatus, comprising:
   a processor; and
   a memory storing program instructions that when executed cause the processor to perform operations comprising:
      receiving an initial hardware design specifying an implementation for information flow in hardware circuitry, wherein the initial hardware design comprises at least two variables relating to the information flow;
      receiving one or more security labels annotating the initial hardware design, wherein each of the one or more security labels corresponds to a respective variable of the at least two variables;
      receiving, in a high-level security language, a security property specifying a restriction on the information flow in the hardware circuitry, and, thus, the security property defining secure information flow in the hardware circuitry, wherein the security property specifies a relationship between the variables;
      designating each of the one or more security labels to a corresponding security level in accordance with the specified restriction by generating, based on the security property, an ordering structure specifying a hierarchical order comprising at least two security levels;
      generating a modified hardware design including automatically assigning a respective value to each of the one or more security labels in the initial hardware design based on the generated ordering structure, wherein each respective value is determined in accordance with the corresponding security level designated for each of the one or more labels, wherein the operation of automatically assigning values to the security labels includes translating the security property from the high-level language into gate-level hardware logic; and processing the automatically assigned label values to create a representation of security logic for the hardware circuitry, wherein the security logic implements the secure information flow defined by the security property.

8. The apparatus of claim 7, wherein the hierarchical order of the at least two security levels comprises a higher security level corresponding to a more restricted label specified in the security property and a lower security level corresponding to a less restricted label specified in the security property.

9. The apparatus of claim 7, wherein the ordering structure is generated as a security lattice.

10. The apparatus of claim 7, wherein the operation of processing comprises:

optimizing the security logic based on the received security property by removing circuity from the security logic or adding circuity to the security logic in accordance with the security property.

11. The apparatus of claim 10, wherein the operation of processing comprises:

performing one or more logic analysis functions using the optimized security logic, wherein the one or more logic analysis functions comprises: formal verification, simulation, and hardware emulation.

12. The apparatus of claim 11, wherein the operation of processing comprises:

deploying the security logic to implement circuitry in fabrication or FPGA.

* * * * *